United States Patent [19]
Lenzkes

[11] 3,727,616
[45] Apr. 17, 1973

[54] ELECTRONIC SYSTEM FOR THE STIMULATION OF BIOLOGICAL SYSTEMS

[75] Inventor: Herbert H. Lenzkes, Pomona, Calif.

[73] Assignee: General Dynamics Corporation, Pomona, Calif.

[22] Filed: June 15, 1971

[21] Appl. No.: 153,316

[52] U.S. Cl. .............................. 128/422, 128/419 E
[51] Int. Cl. ............................................... A61n 1/36
[58] Field of Search ...................... 128/419 C, 419 E, 128/419 P, 419 R, 420, 421, 422, 423, 2.1 A; 340/184

[56] References Cited

UNITED STATES PATENTS

| | | | |
|---|---|---|---|
| 3,236,240 | 2/1966 | Bradley | 128/419 E |
| 3,195,540 | 7/1965 | Waller | 128/419 P |
| 3,646,940 | 3/1972 | Timm et al. | 128/419 E |
| 3,662,758 | 5/1972 | Glover | 128/419 E |

Primary Examiner—William E. Kamm
Attorney—Edward B. Johnson

[57] ABSTRACT

A receiver totally implanted within a living body is inductively coupled by two associated receiving coils to a physically unattached external transmitter which transmits two signals of different frequencies to the receiver via two associated transmitting coils. One of the signals from the transmitter provides the implanted receiver with precise control or stimulating signals which are demodulated and processed in a signal processor network in the receiver and then used by the body for stimulation of a nerve, for example, while the other signal provides the receiver with a continuous wave power signal which is rectified in the receiver to provide a source of electrical operating power for the receiver circuitry without need for an implanted battery.

9 Claims, 13 Drawing Figures

INVENTOR.
HERBERT H. LENZKES,
By Edward B. Johnson
AGENT.

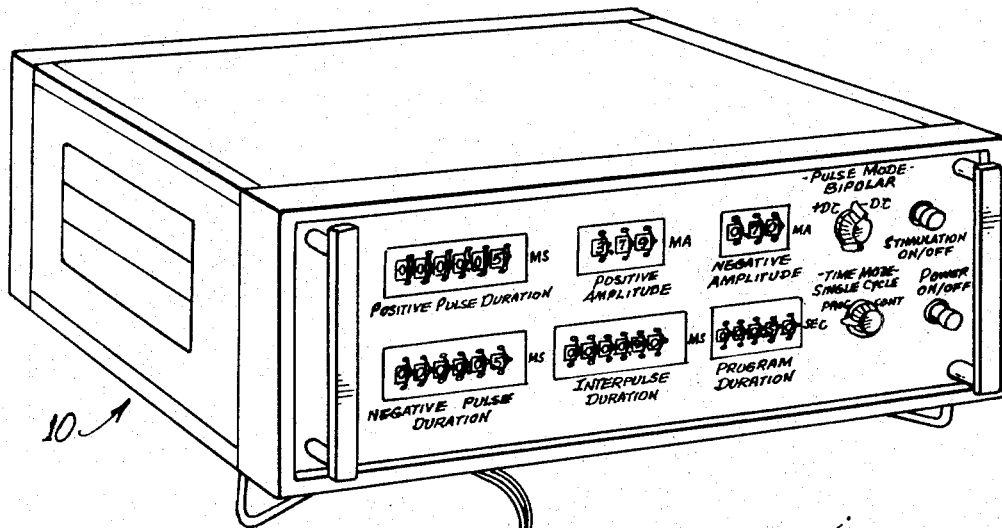
FIG. 3.
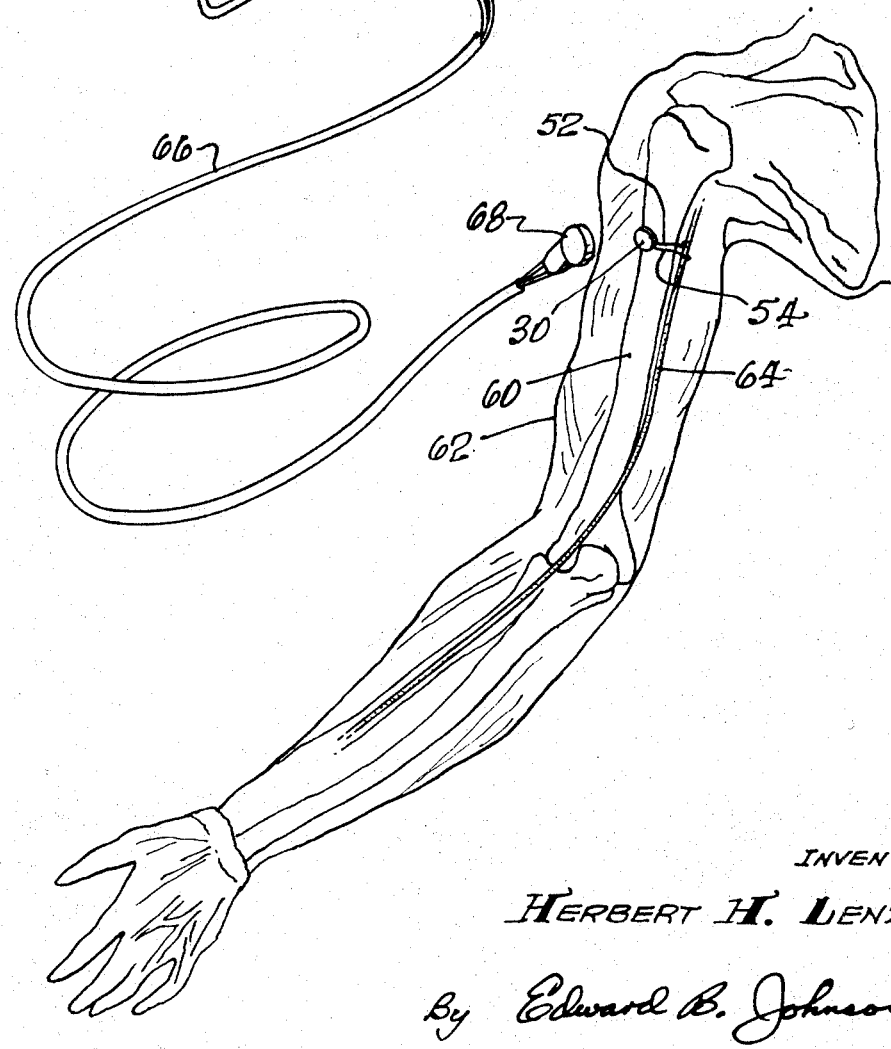
INVENTOR.
HERBERT H. LENZKES,
By Edward B. Johnson
AGENT

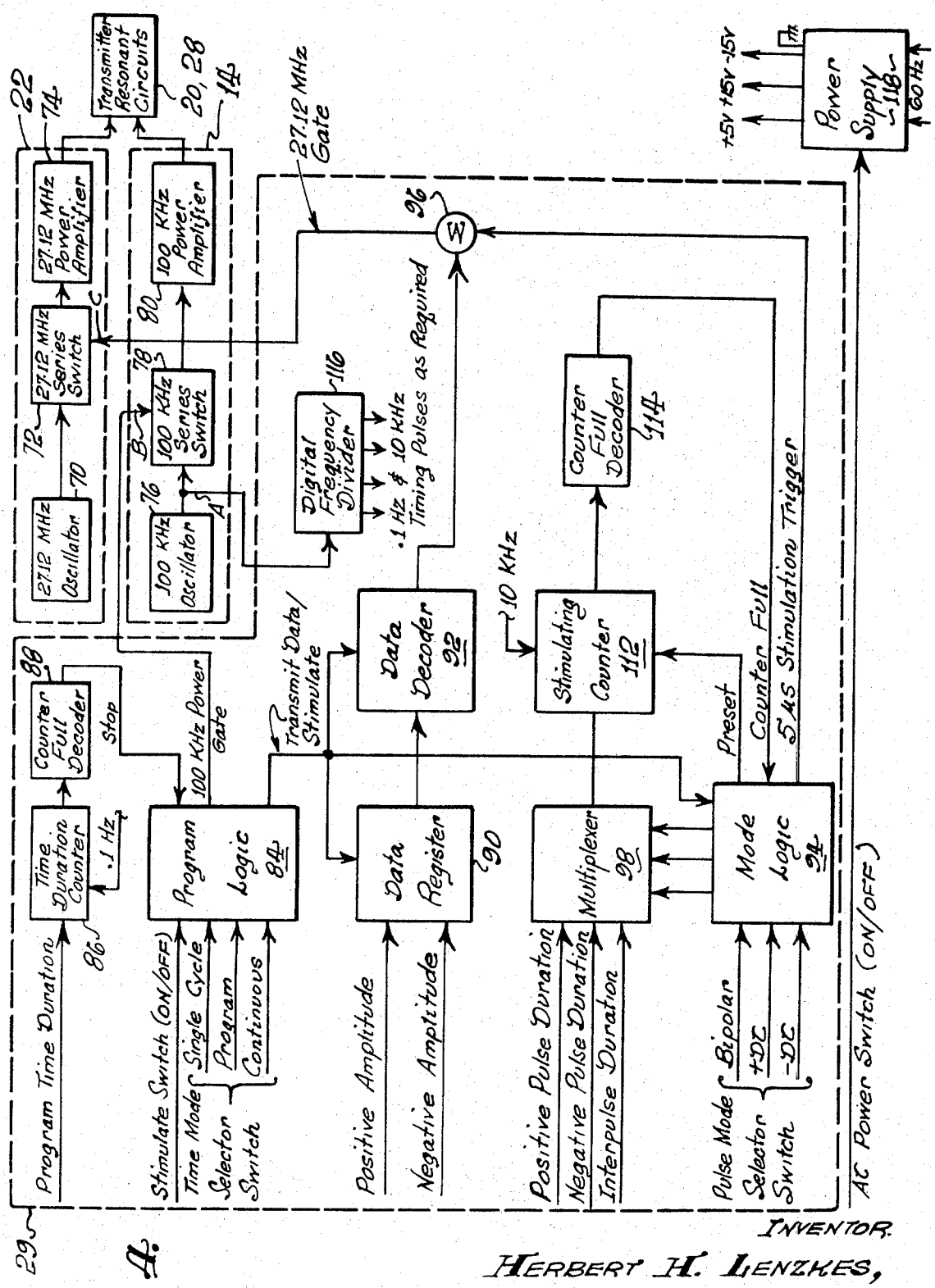

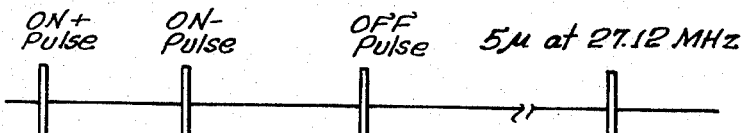

FIG.5(a) Basic Stimulation Word from Transmitter

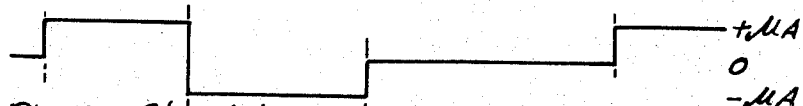

FIG.5(b) Bipolar Stimulating Current to Nerve

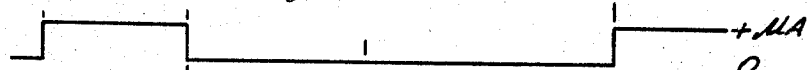

FIG.5(c) Unipolar Positive Stimulating Current to Nerve

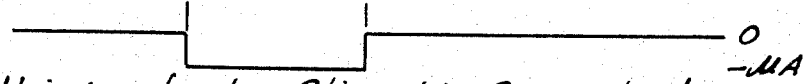

FIG.5(d) Unipolar Negative Stimulating Current to Nerve

FIG.5(e) +DC Stimulation Word from Transmitter

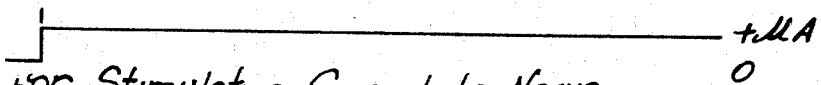

FIG.5(f) +DC Stimulation Current to Nerve

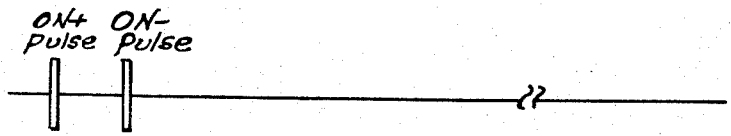

FIG.5(g) -DC Stimulation Word from Transmitter

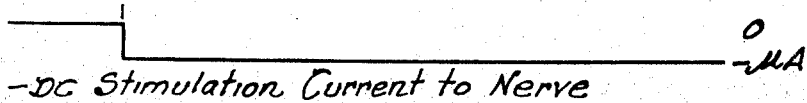

FIG.5(h) -DC Stimulation Current to Nerve

INVENTOR.
HERBERT H. LENZKES,

BY Edward B. Johnson

AGENT.

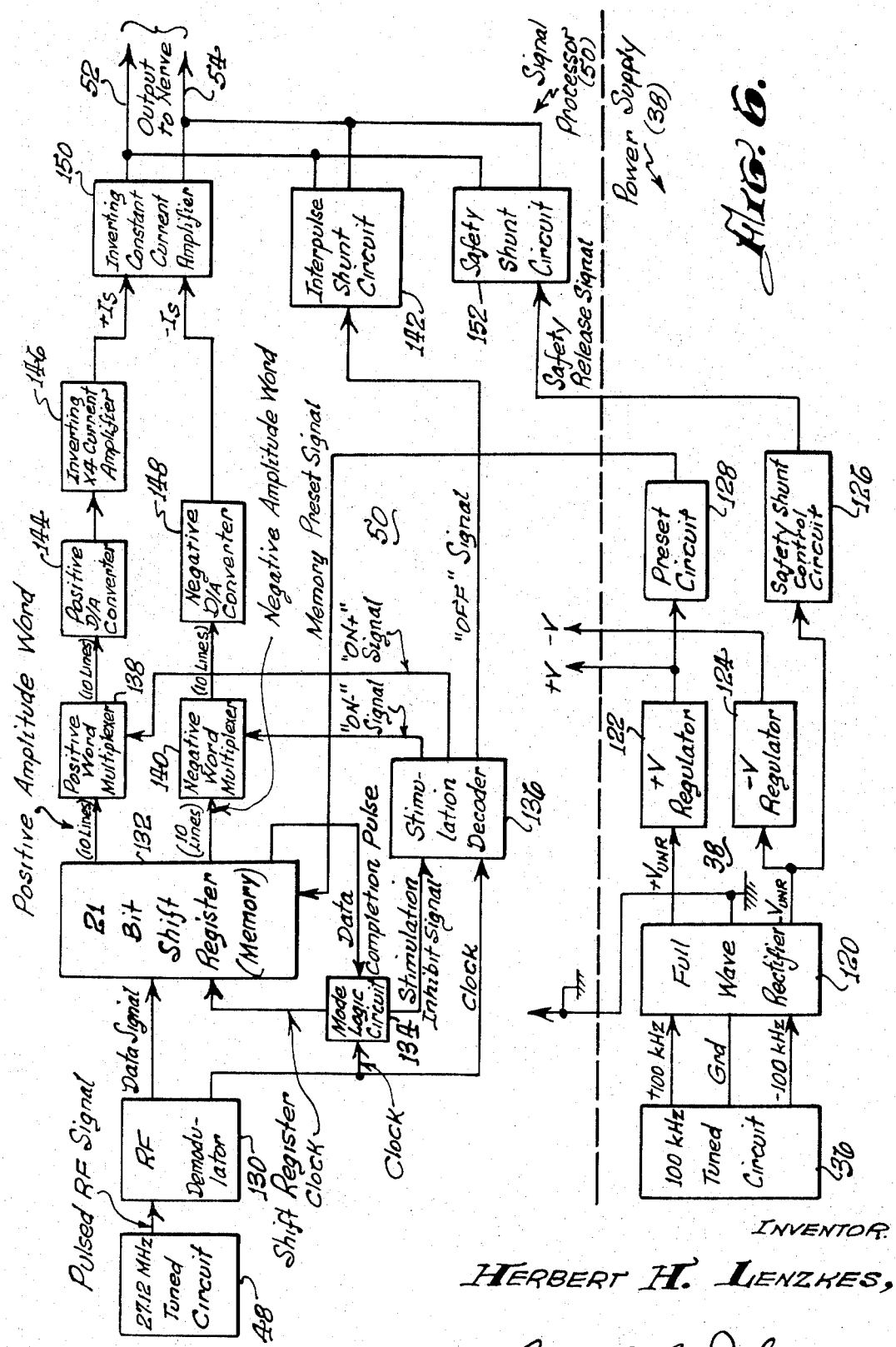

ELECTRONIC SYSTEM FOR THE STIMULATION OF BIOLOGICAL SYSTEMS

BACKGROUND OF THE INVENTION

This invention is directed to means for providing a precisely controlled bipolar current pulse of given polarity, magnitude and duration to a living body for controlling pain, permitting movement of paralyzed extremities, controlling spasticity, stimulating paralyzed urinary bladders and preventing atrophy in clinical applications and for functional and behavioral changes in neurophysiological applications, for example. The system of the invention utilizes a pulse position modulation technique for electrically stimulating biological systems such as nerves, for example, in a manner which presently does not exist. The resulting stimulation output is a constant current biphasic or monophasic signal. Because of the digital nature of the inventive system, accurate and reliable current stimulating levels are achieved with fast rise and fall times. Safety features have been included in the system to prevent extraneous stimulation due to interfering signals. When the implanted receiver is not activated by the external transmitter, any extraneous signals are shunted by a low impedance path in the receiver.

The inventive system is essentially digital in nature, whereas known systems in the prior art employ analog techniques. In addition, the prior art systems employ pulse width modulation in which the resulting pulsed radio frequency signal is detected and filtered to obtain a stimulation waveform. This prior art method, while simple in nature, has many limitations. For example, it cannot provide a precisely controlled amplitude because of its dependency on the coupling coefficient between a primary tuned circuit and a secondary tuned circuit, it cannot provide a biphasic stimulation waveform nor can it generate a direct current stimulation. In addition, its unipolar pulses are not rectangular because an exponential discharge circuit is normally employed. Stimulators of the prior art are designed for specific applications and lack the parameter versatility and safety that can be achieved with the inventive system.

SUMMARY OF THE INVENTION

The system of the present invention includes a transmitter that is inductively coupled by two transmitting coils to a receiver located totally within a living body. The system of the present invention is sometimes called a "Biostimulator" and at other times a "Telestimulator". The transmitter, which is located outside the body, transmits two signals of different frequencies to the receiver via the two transmitting coils. The dual frequency link of the system provides the implanted receiver with control signals or operating information and also a signal from which the receiver can extract its electrical operating power. The receiver basically comprises two receiving coils, a signal processor and a power supply. The output of the receiver is coupled to two electrodes via very small electrical wires which may be attached to a nerve, for example, to stimulate the nerve or to block it. The desired stimulating pulse characteristics such as amplitudes, width, interpulse, periods, etc., are initially entered into the control panel of the transmitter via suitable switches such as rotary thumbwheel switches, for example. These data are converted to a digital format part of which is transmitted to the receiver as a 21-bit Amplitude Data Word. This information is received, decoded and stored by the signal processor portion of the receiver to provide the proper amplitude reference to stimulate the nerve. The remaining portion of the data which has been previously entered into the transmitter is sent to the receiver as a series of Stimulation Words. Each of the Stimulation Words comprises three 5-microsecond radio frequency (r-f) pulses at substantially 27.12 MHz. The time spacing between the pulses determines the time duration of the various parts of the stimulating waveform. Each word operates in real-time to alternately stimulate the nerve with a positive amplitude, a negative amplitude and a zero amplitude. The transmitter also provides a substantially 100 KHz continuous wave power signal which is inductively coupled into the power supply coil in the receiver and rectified to provide electrical power for the receiver circuitry. The power signal is always present whenever the sytem is in use.

Therefore, it is an object of this invention to provide an electronic system for the stimulation of biological systems in a living body in the form of an implantable receiver capable of providing proper stimulation when used in conjunction with an external transmitter.

Another object of this invention is to provide an electronic system for the stimulation of biological systems in a living body in which no internal batteries are utilized nor any direct wire connections into the body are made.

It is a further object of this invention to provide a stimulator system for a living body wherein a dual frequency external transmitter provides inductively coupled control and power signals to a compatible receiver located within the living body.

Other objects and features of the invention, as well as the many advantages thereof, will be readily apparent to those skilled in the art from a consideration of the following written description and accompanying drawings.

BRIEF DESCRIPTION OF THE DRAWINGS

FIG. 3 is a diagrammatic showing of the receiver of FIG. 2 implanted in an arm and an embodiment of an associated transmitter.

FIG. 4 is a functional block diagram of the transmitter shown in FIG. 3.

FIGS. 5a–5h show electrical waveforms available from the transmitter as stimulation words and the resulting stimulating currents.

FIG. 6 is a functional block diagram of the receiver shown in FIG. 2.

DESCRIPTION OF THE PREFERRED EMBODIMENT

Figure 1:
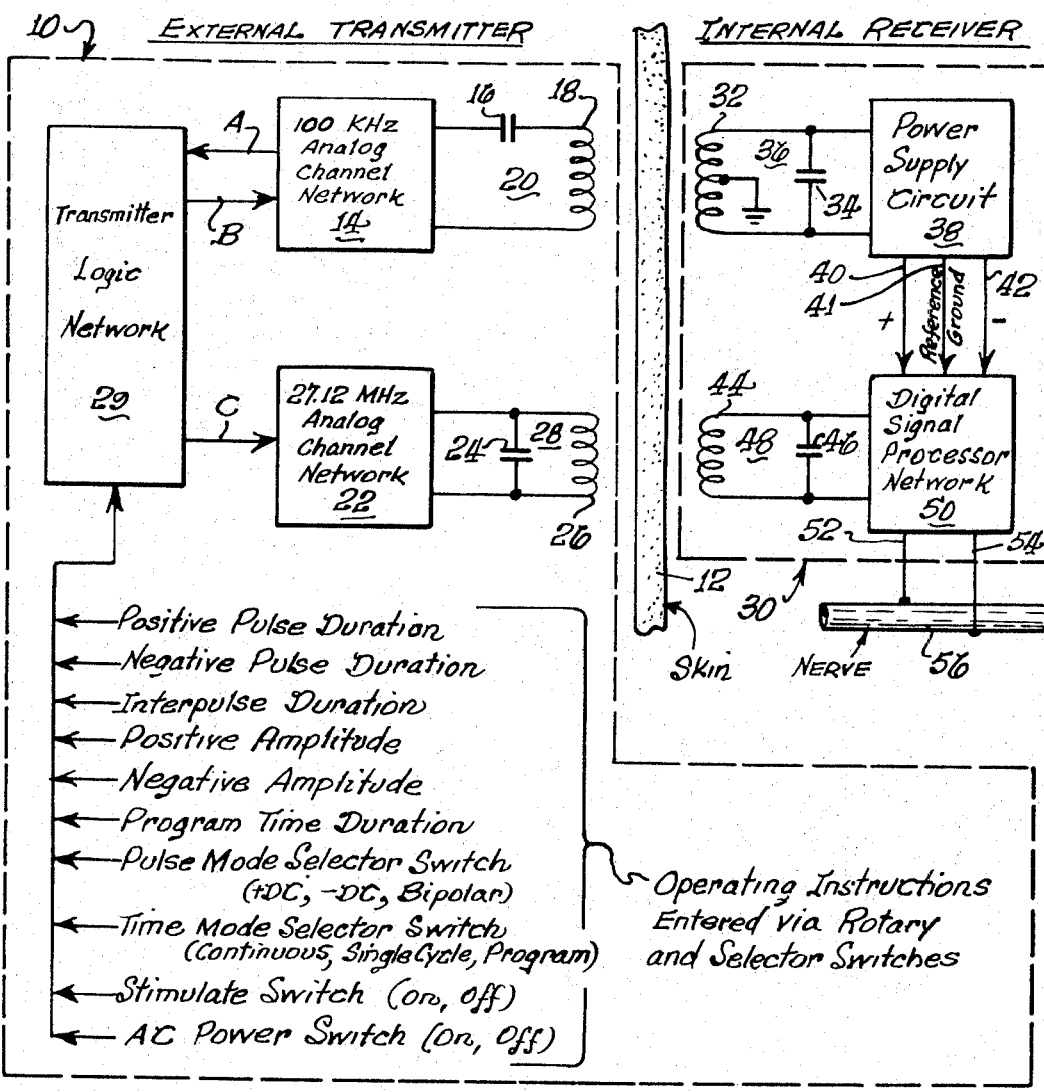
FIG. 1 is a simplified functional block diagram illustrating the overall system involved in the present invention.

Referring now to the drawings, and more particularly to FIG. 1, there is shown a simplified functional block diagram of the overall system which includes a transmitter 10, which may be of the laboratory type, for example, externally located with respect to the outer surface of a skin portion 12 of a living body (not shown). Stimulating and operational information data for operation of the transmitter 10 are listed in FIG. 1. A 100 KHz analog channel network 14 in transmitter 10 provides a substantially 100 KHz continuous wave power signal to a capacitor 16 and a coil or inductor 18 which comprise a substantially 100 KHz series resonant circuit 20. The coil 18 acts as a transmitting antenna. A 27.12 MHz analog channel network 22 in transmitter 10 provides pulsed radio frequency data at substantially 27.12 MHz to a capacitor 24 and a coil or inductor 26 which comprise a substantially 27.12 MHz parallel resonant circuit 28. The coil 26 acts as a transmitting antenna. Coupled to the 100 KHz analog channel network 14 and to the 27.12 MHz analog channel network 22 by connecting leads A, B and C is a transmitter logic network 29 which processes the stimulating and operational information data listed in FIG. 1.

In practice, the capacitor 16 in the resonant circuit 20 (being relatively large in size) is physically located with the other components of the 100 KHz analog channel network 14, whereas the inductor 18 of the resonant circuit 28 together with the inductor 26 and capacitor 24 of the resonant circuit 28 are encased in a suitable protective housing and as a unit, the combination is sometimes called "the transmitter probe". Each of the circuits encased in the "probe" is preferably connected to its respective channel by a coaxial cable (not shown).

As a point of interest, the simple resonant circuit 28 could be changed, if desired, to a preloaded, tapped resonant circuit wherein a resistor is connected in parallel with the inductor 26 and two series capacitors are connected in parallel with the resistor/inductor combination. The center conductor of the appropriate coaxial cable would be connected between the two series capacitors.

The particular frequencies chosen for the preferred embodiment are by way of example only, and it is well understood by those skilled in the art that other frequency combinations as authorized by FCC regulations may be substituted.

Positioned completely underneath the skin portion 12 is an implantable receiver 30 which includes a coil or inductor 32 connected in parallel with a capacitor 34 which comprise a 100 KHz parallel resonant circuit 36. The inductor 32 acts as a receiving antenna to receive the inductively coupled 100 KHz power signal from the inductor 18 of the resonant circuit 20. The received power signal is rectified and regulated in a power supply circuit 38 to provide electrical power of the proper potential for the implanted electronics via conductors 40, 42 and the reference ground 41. A coil or inductor 44 is connected in parallel with a capacitor 46 and comprise a 27.12 MHz parallel resonant circuit 48. The coil 44 acts as a receiving antenna to receive the inductively coupled 27.12 MHz control or operating information signal from the coil 26 of the resonant circuit 28. The received control signal is processed in a signal processor network 50 the output of which is connected via male interconnect conductors 52, 54 and very small wires to a nerve 56, for example. In describing the preferred embodiment of the present invention, nerve stimulation has been chosen as one example only of the many uses thereof, and it will be readily understood by those skilled in the art that the present invention can be used in many clinical and neurophysiological applications.

Figure 2:
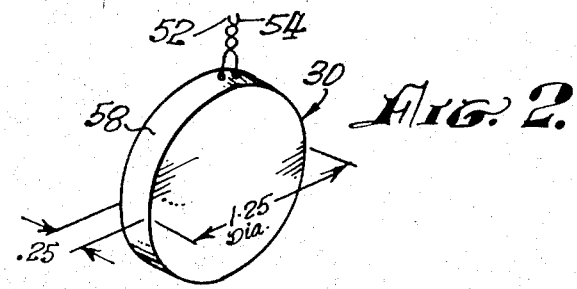
FIG. 2 is a dimensioned view of an encapsulated embodiment of the implantable receiver of the system.

Utilization of microelectronic fabrication techniques during the past few years has resulted in an electronic packaging science wherein many complex electronic circuits can be condensed into small packages. As an illustration of the science of microminiaturization, FIG. 2 shows the dimensions of an actual size example of the receiver 30 of the present invention contained in a 0.25 inch thick circular package of 1.25 inch diameter. This small size allows utilization of the receiver 30 in most parts of the human body. In the example of FIG. 2, the implantable receiver 30 is contained in a hermetically sealed all-ceramic package which is encapsulated with medical-grade silicone rubber 58, for example, to reduce the possibility of body contamination and rejection. The majority of the electronic circuitry is contained on two circular ceramic substrates (not shown). This circuitry generally consists of thick film resistors, chip capacitors, and various semiconductor chips and interconnections. The power supply coil 32 of the receiver 30 is concentrically wound on the outer edge area of a ceramic circular coil form (not shown) which also serves as a housing for the two circular substrates. The signal coil 44 is printed on the outside portion of one of the circular substrates which also acts as a cover for one end of the unit. The male interconnectors 52, 54 are imbedded in the power supply coil form to provide mechanical integrity. The all-ceramic package is extremely rugged and will survive in very adverse environments. The implantable receive 30 is surgically placed within a desired body area as shown in FIG. 3 and is preferably affixed to the nearest bone structure. In FIG. 3, the receiver 30 is affixed to the humerus 60 of an arm 62 by using synthetic materials similar to those used for bone repair, for example, and the receiver output interconnectors 52, 54 are connected to a nerve 64 via very small electrical wires (not shown). In practice, the free ends of two electrical conductors (not shown) having female connectors on the other ends are attached to the nerve to be stimulated. The female connectors are then slipped over the male interconnectors 52 and 54. Also shown in FIG. 3 is an example of the transmitter 10 with its output cabling 66, preferably two coaxial cables, and the encased transmitter "probe" in a housing 68. The transmitter coils 18, 26 in the "probe" housing 68 are wound similarly to receiving coils 32, 44 on a circular coil form or on individual coil forms and are protectively encased or encapsulated in a strong plastic material, for example. Stimulation of the nerve 64 is achieved by placing the transmitter coils 18, 26 contained in the housing 68 approximately, for example, one-half inch near, or actually on, the skin portion closest to the implanted receiver 30 so the receiver coils 32, 44 can easily receive the transmitted signals and then activate the transmitter. The operating instructions listed in FIG. 1 are entered into the transmitter 10 prior to stimulation via suitable switches as shown in FIG. 3 in which actual values are depicted to illustrate an exemplary operational setup. Also shown in the FIG. 3 example of a transmitter are the switches listed in FIG. 1.

Two major problems must be considered in the design and fabrication of devices to be implanted in a living body. These two major problems involve the selection of enclosure and connector materials. The body fluids present a rather formidable challenge to the enclosure or cover for an implantable device because of their corrosive action. Materials that provide long-term protection to the device's electronics and that are compatible with the body chemistry are: ceramic, glass, synthetic resinous materials and some metals such as surgical-grade stainless steel and platinum, for example. The qualities that make an all-ceramic package a highly desirable choice for implantable devices include: mechanical strength, electrical isolation, resistance to body fluids, adequate thermal conductivity, compatibility with hybrid technology and low cost. All connectors must be small and reliable and must also be compatible with the body fluids. The conductors used for the nerve stimulator described herein are made of stainless steel but could also be made of platinum, gold, silver and tantalum or alloys of these metals, for example. Encapsulating materials should be electrically insulating, inert, non-toxic, non-irritating and sterilizable. In addition to the silicone rubber 58, other examples of encapsulant materials are: silastic resins, vinyl chloride, acrylic polymers, polystyrene, tetrafluoroethylene polymers and the like.

Referring now to FIG. 4, there is shown a functional block diagram of the transmitter 10. The stimulating word(s) and operational information data shown in FIG. 1 are again included in FIG. 4. The analog portion of the transmitter consists of two channels, one at 100 KHz and the other at 27.12 MHz, which are functionally identical. The 27.12 MHz analog channel network 22 comprises an oscillator 70 connected through a series switch 72 to a power amplifier 74. The 100 KHz analog channel network 14 comprises an oscillator 76 connected through a series switch 78 to a power amplifier 80. The connecting leads A, B and C to the transmitter logic network 29 are shown. Lead A is connected to the output of the 100 KHz oscillator 76, load B is connected to an input of the 100 KHz series switch 78 and lead C connects to an input of the 27.12 series switch 72. Each of the power amplifiers 74, 80 is preferably connected to its respective resonant circuit 28, 28 via a coaxial cable as discussed hereinabove. In each channel, the series switch gates the signal from the appropriate oscillator to the amplifier as a function of the controlling logic. The 100 KHz oscillator 76 is also used to develop all of the timing functions required by the digital portion of the receiver 30 to be described hereinafter.

Connected to the 100 KHz series switch 78 is an output of a program logic circuit 84 in the transmitter logic network 29 to which is coupled a full decoder network 88. A time duration counter circuit 86 is connected to the counter full decoder network 88. Another output of the program logic circuit 84 is connected to a data register 90, a data decoder 92 and a mode logic circuit 94. The output of the data register 90 is connected to the data decoder 92 which is coupled to a summing network or junction 96 as is a 5-microsecond stimulation trigger output of the mode logic circuit 94. The mode logic circuit 94 is additionally coupled to a multiplexer 98 and to a stimulating counter 112 to which it provides a presetting signal. The output of the stimulating counter 112 is connected to a counter full decoder circuit 114 whose output is fed back to the mode logic circuit 94. A digital frequency divider 116 is connected to the output of the 100 KHz oscillator to feed clock signals of 0.1 Hz and 10 KHz, for example, as required to selected circuits such as the time duration counter 86 and to the stimulating counter 112, respectively. A power supply 118, operating from a 60 Hz power source, provides all of the operating voltages for the transmitter.

Prior to activating the transmitter, the operating instructions listed in FIGS. 1 and 4 are entered into the transmitter via suitable switches such as the rotary thumbwheel and selector switches shown in FIG. 3. The transmitter converts this information into a digital sequence of words that are transmitted to the implanted receiver 30 at the appropriate time. The transmitter 10 is activated by the A-C Power Switch which supplies the +5 volts and ±15 volts to the appropriate electronics via the power supply 118. No signals are transmitted from the transmitter at this time. When the Stimulate Switch is activated, the 100 KHz series switch 78 is immediately closed which causes the 100 KHz power signal to be inductively coupled to the resonant circuit 36 in the receiver. No 27.12 MHz signal is transmitted yet because the preset memory pulse of the receiver has just been activated by the power supply 38 and it must be allowed to decay to insure proper reception. Approximately one millisecond after activation of the Stimulate Switch, the program logic circuit 84 enables the data register 90 and the data decoder 92 which operate together to read the Data Completion Pulse (1 bit), the Positive Amplitude (10 bits) and the Negative Amplitude (10 bits) that have been previously entered into the transmitter; connect these data into binary bits where a low state or "0" is 5 microseconds in width and a high state or "1" in 50 microseconds in width; and encode this information onto a 27.12 MHz r-f signal by turning on the 27.12 MHz series switch 72 as required. This 21-bit pulse width modulated Amplitude Data Word is then serially transmitted to the receiver 30 only once.

The program logic circuit 84 permanently inhibits the data register 90 and the data decoder 92 after the 21-bit Amplitude Data Word has been transmitted and it also enables the mode logic circuit 94. The mode logic circuit 94 momentarily presets the stimulating counter 112 via the multiplexer 98 to a count value specified by the Positive Pulse Duration. The 10 KHz clock signal from the digital frequency divider 116 now causes the stimulating counter 112 to increase its count until it is full. This state is sensed by the counter full decoder 114 which causes the mode logic circuit 94 to momentarily preset the stimulating counter 112 via the multiplexer 98 to a count value specified by the Negative Pulse Duration. The foregoing sequence is automatically repeated, with the Interpulse Duration, the Positive Pulse Duration and the Negative Pulse Duration, etc., being used to preset the stimulating counter 112. Each time the stimulating counter 112 is reset by the mode logic circuit 94, a 5-microsecond pulse is generated by the mode logic circuit 94 which gates the 27.12 MHz series switch 72 through the summing junction 96 to generate another bit of the 3-bit Stimulating Word.

The Pulse Mode Selector Switch allows the user to determine which one of the five stimulating signals shown in FIGS. 5b, c, d, f and h should be used to stimulate the nerve. From the basic Stimulation Word, the user can select either a bipolar pulse, unipolar positive pulse, or unipolar negative pulse stimulation via the Pulse Mode Selector Switch, depending upon the negative and positive amplitudes that have been entered into the transmitter via the data register 90. The "+DC" mode modifies the operation of the mode logic circuit 94 by inhibiting its recycling operation after the initial presetting of the stimulating counter 112; thus only the "ON+"b bit of the stimulation word is transmitted as shown in FIG. 5e. The "−DC" mode modifies the mode logic circuit 94 in a similar manner except that only the "ON+"b pulse (at zero microamperes positive amplitude) and the "ON−" pulse are transmitted before the mode logic circuit 94 recycling operation is inhibited.

The Time Mode Selector Switch for the Program Logic Circuit 84 determines the time duration that the nerve will be stimulated. The Single Cycle mode selection will allow the transmitter to transmit only one Stimulation Word. Selection of the Program mode will allow stimulation to occur only for the Program Time Duration which has previously been entered into the transmitter through the time duration counter 86. The method of operation is functionally identical to that of the stimulating counter 112 and its associated counter full decoder 114, with the 0.1 Hz clock signal used in lieu of the 10 KHz clock signal. The Continuous mode selection via the Time Mode Selector Switch will allow stimulation to continue uninterrupted until the Stimulate Switch is deactivated.

Stimulation of the nerve will cease whenever the Stimulate Switch is deactivated and the Stimulation Word is completed. This function is performed automatically when the Time Mode Selector Switch is in either the Single Cycle mode or the Continuous mode. Deactivation of the Stimulate Switch will shut off the 100 KHz power signal as soon as the Stimulation Word has been completed.

Several different types of transmitters may be used with the implantable receiver 30. Selection will depend upon the particular need. The laboratory transmitter shown in FIG. 4 and described hereinabove would be used by professional personnel in hospitals, clinics and doctors' offices to collect experimental and diagnostic data and to determine the fixed program parameters to be prescribed for the patient's personal pre-programmed transmitter. The pre-programmed transmitter is available in at least two other configurations: the bedside transmitter and the portable transmitter. Both versions are functionally identical to the laboratory transmitter except that the operating instructions such as stimulating levels, polarities, time durations, etc., discussed hereinabove, will be pre-programmed. The bedside transmitter will ordinarily use conventional 115V a-c power for its operation whereas the portable unit will be battery operated.

The receiver 30 provides a basic bipolar constant current waveform to the nerve from which four other stimulating modes can be externally selected. Utilizing the circuitry described herein, the time duration of any polarity pulse can be varied in real-time from 20 microseconds to 10 seconds in 10 microsecond intervals. The positive and negative amplitudes of these current pulses can be externally selected from 0 microamperes to 4 milliamperes in 10 microamperes intervals. A pulse repetition of 0.03 Hz to 16.7 KHz can be obtained, for example. The shape of the current pulses will generally always be rectangular, having a 0 to 90 percent rise and fall time of less than 3 microseconds.

As previously expressed hereinabove, five types of stimulating signals may be applied to a nerve, for example. Referring again to FIGS. 5a–5h, the basic bipolar waveform available from the receiver 30 is shown at 5b. This corresponds to the basic stimulation word shown at 5a. By setting either the negative or positive polarity to 0 microampere, a positive unipolar current pulse 5c or a negative unipolar current pulse 5d can be obtained. A programmable steadystate current level of either polarity can also be generated from either unipolar current pulse by extending the time duration of the current pulse as shown at 5f and 5h. The stimulation currents shown at 5f and 5h correspond to the DC stimulation words shown at 5e and 5g, respectively.

The receiver 30 can be divided into two major sections: the power supply circuit 38 and the signal processor network 50. The function of the power supply circuit 38 is to generate the required electrical power for the implanted electronics and to provide two control signals to the signal processor network 50. The 100 KHz tuned center-tapped coil 32 is used as the secondary of the power double-tuned coupling circuit 20, 36 to develop the 100 KHz power signal. This signal is rectified, filtered, and regulated to provide stable operating voltages for the electronics. The Memory Preset and Safety Release control signals are generated from the supply voltages to preset the memory circuit and release the safety shunt circuit, respectively. These latter circuits will be more fully explained hereinafter.

The function of the signal processor network 50 is to receive, demodulate, and process all operational instructions that are sent from the transmitter 10 and to generate with the aid of the power supply the proper stimulating amplitude, polarity and time duration signal. The 27.12 MHz tuned coil 44 is used as a secondary of the signal doubletuned coupling circuit 28, 48 to develop the instructions that were sent from the transmitter. The first 21 bits of instructions is the Amplitude Data Word which is demodulated and stored in the receiver memory circuit. All remaining bits are considered as stimulation instructions and are demodulated and decoded as such. These stimulation instructions select either the Negative Amplitude Word or the Positive Amplitude Word or neither word from the receiver memory circuit. The selected amplitude word, if selected, is converted to an analog signal which controls the inverting constant current amplifier. This amplifier then forces the proper constant current signal through the nerve and will be more fully discussed hereinafter.

Referring now to FIG. 6, the receiver 30 is shown as comprising the power supply circuit 38 which includes the 100 KHz tuned circuit 36 connected to a full-wave rectifier 120 which provides positive and negative unregulated voltages to respective voltage regulators 122, 124. The negative unregulated voltage from the full-wave rectifier 120 is also connected to a safety shunt control circuit 126. In addition to supplying the positive operating voltage to the signal processor network 50, the output of the positive voltage regulator 122 is connected to a preset circuit 128. The output of the negative voltage regulator 124 supplies the negative operating voltage to the signal processor network 50.

In the signal processor network 50 the 27.12 MHz tuned circuit 48 is connected to an r-f demodulator 130 whose output is interconnected with a 21-bit shift register (memory) 132 to couple in the overall Data Signal, and to a mode logic circuit 134 and a stimulation decoder 136 to provide the necessary clock pulses. The mode logic circuit 134 has one output connected to provide a Shift Register Clock to the 21-bit shift register 132 and another output connected to provide a Stimulation Inhibit Signal to the stimulation decoder 136. Also coupled to the shift register 132 is a Memory Preset Signal from the output of the preset circuit 128 in the power supply 38. The shift register 132 has an output connected to provide a Data Completion Pulse to the mode logic circuit 134. A 10-line output (for the 10 bits) is connected to provide the Positive Amplitude Word to a positive word multiplexer 138, and another 10-line output (for the other 10 bits) is connected to provide the Negative Amplitude Word to a negative word multiplexer 140. An output of the stimulation decoder 136 is connected to the negative word multiplexer 140 and provides the "ON−" Signal. A second similar output from the stimulation decoder 136 provides the "ON+" Signal to the multiplexer 138. A third output from the stimulation decoder 136 provides an "OFF" Signal and it is coupled to an interpulse shunt circuit 142 the output of which is connected to receiver output conductors 52, 54. A 10-line output of the positive word multiplexer 138 is connected to a positive digital-to-analog converter 144 whose output in turn is coupled to an inverting X4 current amplifier 146. A 10-line output of the negative word multiplexer 140 is connected to a negative digital-to-analog converter 148. The outputs of both converters 146, 148 are coupled to an inverting constant current amplifier 150 whose output is connected to receiver output conductors 52, 54. Also connected to receiver output conductors 52, 54 is a safety shunt circuit 152 which receives a safety release signal as appropriate from the safety shunt control circuit 126 in the power supply 38.

In operation, the digital instructions from the transmitter 10 are received by the 27.12 MHz tuned circuit 48 and fed to the r-f demodulator 130 which comprises a voltage doubler diode detector and a low pass filter. The pulsed r-f data signal from the transmitter 10 comprises the 21-bit Amplitude Data Word and a series of Stimulation Words. Each Stimulation Word comprises three 5-microseconds r-f pulses. The r-f demodulator 130 converts the pulsed 27.12 MHz r-f signal to a rectified positive video signal which serves as the Clock. The Clock Signal is used in three separate applications: it passes through the low pass filter which serves as a pulse width discriminator to derive the Data Signal for the 21-bit shift register 132, it is used in the mode logic circuit 134 to generate the Shift Register Clock for the shift register 132, and it serves as a trigger signal to the stimulation decoder 136. Demodulation of the 3-bit Stimulation Word produces three Clock Signals and no Data Signals because each of the 3-bits is only 5 microseconds wide.

The 21-bit register 132, comprising a series grouping of 21 flip-flop circuits, functions as a memory. It stores a Data Completion Pulse, a Positive Amplitude Word and a Negative Amplitude Word. The memory is initially cleared by the Memory Preset Signal which is generated by the preset circuit 128 in the power supply 38. the 21-bit Amplitude Data Word is transmitted only after the Memory Preset Signal has been utilized. The Amplitude Data Word enters into the shift register 132 on the positive slope of the Shift Register Clock. The Shift Register Clock is an inverted version of the Clock signal which is gated depending upon whether the receiver system is in the "receive data" mode or "stimulation" mode. The 1-bit Data Completion Pulse enters into the shift register 132 first. It is followed by a 10-bit word which represents the negative stimulating current amplitude and another 10-bit word which represents the positive stimulating current amplitude word. These 21 bits of information are called the Amplitude Data Word, as mentioned previously hereinabove. When the Data Completion Pulse has been shifted into the end position of the shift register 132, the Shift Register Clock is inhibited by the mode logic circuit 134 which converts the shift register into a static memory.

The mode logic circuit 134 which comprises two NOR gates determines if an inverted version of the Clock is to go to the shift register 132 as the Shift Register Clock or if it can be processed by the stimulation decoder 136. The absence of the Data Completion Pulse indicates that the memory is not full. This forces the Stimulation Inhibit Signal to be active which inhibits the stimulation decoder 136 while generating and applying the Shift Register Clock to the memory. The presence of the Data Completion Pulse indicates that the memory is full which causes the Shift Register Clock and the Stimulation Inhibit Signal to be deactivated. This essentially converts the shift register 132 to a static memory and allows the stimulation decoder 136 to be activated.

The stimulation decoder 136 is a "divide-by-three" counter with each state of the counter indicating the state of the Stimulation Word. These three states are used to generate the time duration and polarity of the stimulating output current to the nerve. The resulting three output signals ("ON+", "ON−", and "OFF") are mutually exclusive in that only one can be activated by any one time. The presence of the Stimulation Inhibit Signal disables the counter and forces the "OFF" to its activation state. The stimulation decoder 136 is activated only after the 21-bit shift register 132 is full. Only then is it permitted to count the number of Clock pulses to determine the state of the 3-bit Stimulation Word. The absence of the Stimulation Inhibit Signal then enables the stimulation decoder 136 which activates the "ON+" upon receiving the first clock pulse, the "ON−" upon receiving the second Clock pulse, and the "OFF" upon receiving the third Clock pulse. This process is then repeated as often as required. These outputs alternately select, via the positive word multiplexer 138 and the negative word multiplexer 140, the Positive Amplitude Word, the Negative Amplitude Word, or neither of the amplitude words. The latter condition occurs during the interpulse period and results in no stimulation of the nerve. Each of the multiplexers 138, 140 comprise a grouping of ten AND-OR gates. The polarity and amplitude of the nerve stimulation signal is achieved by digitally selecting either the stored Positive Amplitude Word or the stored Negative Amplitude Word. In each case the amplitude is represented by a 10-bit word. Two 10-bit multiplex switches, then, are used to select either of the two words or neither of them. In no case are both words selected simultaneously.

Conversion of the selected 10-bit digitally coded Amplitude Word and conversion of the "OFF Word" to an analog signal is performed by the digital-to-analog converters 144, 148. Each of the converters 144, 148 comprise a grouping of ten resistors each serially connected to the output of a selected AND-OR gate in its appropriate multiplexer circuit 138, 140. Each amplitude bit from the multiplexers is weighted by using a different value for each of the series resistors. The resulting currents which flow through the ten resistors in each converter 144, 148 are summed together to generate a current which is directly proportional to the digital code. No current results from a digital-to-analog converter which is fed from an "OFF" multiplexer. Summation of the positive amplitude is performed in the inverting X4 current amplifier 146 while the negative amplitude is summed in the inverting constant current amplifier 150, each of which comprise an operational amplifier circuit. In either case, the summing of the digital-to-analog decoding currents is performed by an operational amplifier which allows the summation to occur at zero volts. In this manner, the weighting current per decoding bit can be accurately established. The weighting currents for the Positive Amplitude Word are four times less than that of the Negative Amplitude Word so that less electrical power is consumed by the positive digital-to-analog converter 144.

The inverting X4 current amplifier 146 performs three functions: it sums together the weighting currents of the positive stimulation current; it inverts the polarity of the resulting current so that it will have a positive polarity at the output of the inverting constant current amplifier 150; and it amplifies the current level by a factor of four to be compatible with the Negative Amplitude Word.

The function of the inverting constant current amplifier 150 is threefold: it provides a constant current source with which the nerve will be stimulated; it sums together the weighting currents of the negative stimulation current; and it sums in the positive stimulating current from the inverting X4 current amplifier 146. The latter two functions are performed at zero volts to obtain the proper levels. These functions are performed in the inverting constant current amplifier 150 by a unity gain operational amplifier with the nerve being used as the feedback impedance.

The output current from the inverting constant current amplifier is effectively shunted out at various times by placing two low impedance shunt circuits in parallel across the nerve. The safety shunt circuit 152 comprises a field-effect transistor having a nominal 60 ohms impedance, for example, which is across the nerve at all times except when the power supply 38 is activated. The state of the safety shunt circuit 152 is controlled by the safety shunt control circuit 126 which comprises a low pass resistor-capacitor filter in which a diode is in parallel with a 1 megohm resistor to generate the Safety Release Signal. This signal is a modified version of the unregulated negative supply voltage from the full wave rectifier 120 and differs from it only in that an unsymmetrical time delay has been introduced. The time delay occurs only when the negative voltage is being increased. The absence of the negative supply, which may be due to the lack of the 100 KHz continuous wave power signal or due to a circuit malfunction, will result in having the 60-ohm safety shunt circuit 152 across the nerve. Only when the negative supply is present will the low impedance shunt of the safety shunt circuit 152 be removed. The other shunt is the interpulse shunt circuit 142 comprising another field-effect transistor having a nominal 75 ohms impedance, for example, which is also across the nerve at all times except when the "ON+" and "ON−" states of the Stimulation Word are activated. At these times, the interpulse shunt circuit 142 receives the "OFF" Signal from the stimulation decoder 136. When the system is not activated, the two separate shunt circuits are across the nerve to insure that no extraneous signal pick-up by the system will introduce unwanted currents to the nerve. Failure to have both power supply voltages present will automatically place one of the shunts across the nerve. This provides a most desirable safety feature.

The 100 KHz continuous wave power signal received by the 100 KHz tuned circuit 36 is converted into positive and negative d-c voltages. These voltages are filtered and regulated in their respective voltage regulators 122 and 124 to provide stable supply voltages for the receiver circuits. The function of the preset circuit 128 is to generate the Memory Preset Signal which is a short duration positive pulse that presets the shift register 132 to zero. The Memory Preset Signal is generated from the regulated positive supply of the positive voltage regulator 122 when the power supply 38 is first activated. The preset circuit 128, in its simplest form, comprises a high pass filter that differentiates the regulated positive voltage received from the positive regulator 122. In another slightly more complex form, the preset circuit 128 may be a voltage-sensing circuit comprising a serially connected input field-effect transistor, zener diode and resistor-to-ground combination connected in parallel across a serially connected resistor and grounded-emitter NPN transistor combination. A capacitor is connected across the zener diode-resistor series subcombination from the negative terminal of the zener diode to the ground side of the resistor. The base of the NPN transistor is connected to the positive terminal of the zener diode; and the collector, connected to the field-effect transistor through the series resistor in the NPN circuit, provides the Memory Preset Signal output. The field-effect transistor acts like a constant current diode in this circuit. Besides presetting the memory of the shift register 132 to zero, this alternative preset circuit clears the memory and returns the operation back to the "enter data mode" from the stimulation mode, if the positive voltage supply drops below a preset value. Such a situation can arise, for example, by moving the transmitter probe too far away from the implanted receiver during operation of the system.

A summary of the operation of the system is as follows:

TIMING SEQUENCE

Operation of the system requires four operational time modes. First the 100 KHz power is turned on so that the power supply 38 can generate the required voltages for the implanted electronics. Second, the desired pulse amplitudes are transmitted via the Amplitude Data Word to the signal processor 50 in digital form where they are decoded and stored. This phase requires approximately 4,200 microseconds. Third, stimulation of the nerve may now begin in real-time. This phase of the operation will last as long as nerve stimulation is required. Fourth, stimulation is terminated by inhibiting the stimulating word immediately after the "OFF" bit is transmitted and then turning off the 100 KHz power.

The sequence of events which occurs in each of the four time modes is listed below:

Mode 1, Turn-On a. 100 KHz transmitter signal is activated.
b. Implantable power supply 38 is activated.
c. Memory cells are preset to "0" via the Memory Preset Signal from the power supply 38.
d. Safety Shunt 152 is activated to remove its 60 ohm shunt impedance from across the output 52, 54.
e. Signal processor 50 is in "enter data" status with the stimulation decoder 136 inhibited.

Mode 2, Transmit Data:

a. 21-bit Amplitude Data Word is serially transmitted.
b. Amplitude word is decoded and stored.
c. Memory 132 is inhibited as the stimulation decoder 136 is activated.
d. Signal processor 50 is in "stimulation" mode.

Mode 3, Stimulate a. The first bit of the three-bit Stimulating Word will remove the interpulse shunt 142 and will cause the programmed positive current to flow through the nerve.
b. The second bit of the Stimulating Word will shutoff the positive current and will cause the programmed negative current to flow through the nerve.
c. The third pulse of the Stimulating Word will shut-off the negative current and activate the interpulse shunt 142 across the nerve.
d. Further stimulation of the nerve can be obtained by repeating the above steps (a through c).

Mode 4, Turn-Off a. The Stimulation Word is inhibited immediately after the "OFF" bit is transmitted. (The interpulse shunt 142 is deactivated to place a low impedance across the output 52 and 54).
b. The 100 KHz power signal is shut-off.
c. The safety shunt 152 is deactivated to place a low impedance across the output 52 and 54.

TRANSMISSION AND STORAGE OF THE AMPLITUDE DATA WORD:

The desired stimulating amplitudes are transmitted as a coded 20-bit binary word along with the 1-bit Data Completion Pulse. Because of the ease of implementing the transmitted logic network 29, a binary coded decimal format (BCD) is used instead of a coded binary format.

The signal processor 50 receives this word, demodulates it and stores the coded amplitude bits in its memory. When the Data Completion Pulse has gone through all of the flip-flops in the shift register 132 and is finally entered in the last flip-flop, the shift register 132 is locked by inhibiting its clock and now is employed as a static memory.

During this data transmission mode no stimulation of the nerve is performed. In fact, the interpulse shunt 142 is deactivated and places a nominal 75 ohm impedance across the nerve to prevent voltage buildup on the nerve and to shunt any demodulated signals that might stimulate the nerve.

The presence of the Data Completion Pulse in the last flip-flop signifies that the Amplitude Data Word has been entered into the shift register 132 and that stimulation of the nerve can now be performed in real-time as commanded by the transmitter 10.

TRANSMISSION AND UTILIZATION OF THE STIMULATION WORD(S):

Stimulating instructions from the transmitter will normally be encoded into a repetitive 3-bit pulse positioned modulated Stimulation Word(s). Each Stimulation Word consists of three 5-microsecond r-f pulses which are decoded to derive the time period of each portion of the basic bipolar waveform. The time duration of the Negative Pulse Duration, Positive Pulse Duration, and Interpulse Duration is determined by the transmitter from the data entered into it via the thumbwheel switches. The two abbreviated Stimulation Words as described hereinabove are utilized for the + and − DC Modes.

The stimulation decoder 136 provides three outputs which control the state of the current pulse to the nerve. These three controls are mutually exclusive in that only one can be on at any one time. The "ON+" signal enables only the positive digital-to-analog converter 144 which causes the specified positive stimulating current to flow through the nerve. The "ON−" signal enables only the negative digital-to-analog converter 148 which causes the specified negative stimulating current to flow through the nerve. The "OFF" signal deactivates the interpulse shunt which places the nominal 75 ohm shunt impedance across the nerve to avoid voltage build-up and to reduce the dc leakage level.

I claim:

1. An electronic system for the stimulation of a biological system in a living body, said system comprising:

a. transmitter means adapted to be operably associated externally of said living body for generating transmitted pulses of radio frequency energy at a first frequency and for additionally generating transmitted signals of continuous wave energy at a second frequency, said pulses of radio frequency energy including digital stimulation signals for stimulating said biological system, said continuous wave energy including power signals for providing operating voltages in said system;

b. said transmitter means including transmitter logic network means for receiving and processing stimulation and power signal information;

c. said transmitter means additionally including first and second analog channel network means operably connected to said transmitter logic network means and responsive thereto, said first analog channel network means generating said pulses of radio frequency energy at said first frequency containing said digital stimulation signals, said second analog channel network means generating said continuous wave energy at said second frequency containing said power signals;

d. said transmitter means further including first and second resonant circuit means operably connected to said first and second analog channel network means, respectively, and responsive thereto, said first resonant circuit means resonant at substantially said first frequency for transmitting said pulses of radio frequency energy containing said digital stimulation signals, and said second resonant means resonant at substantially said second frequency for transmitting said continuous wave energy containing said power signals;

e. receiver means adapted to be operably positioned within said living body for receiving said pulses of radio frequency energy containing said digital stimulation signals at said first frequency and for additionally receiving said continuous wave energy containing said power signals at said second frequency as transmitted from said transmitter means;

f. said receiver means including third and fourth resonant circuit means responsive to said second and first resonant circuit means, respectively, said third resonant circuit means resonant at substantially said second frequency for receiving said transmitted continuous wave energy containing said power signals, and said fourth resonant circuit means resonant at substantially said first frequency for receiving said transmitted pulses of radio frequency energy containing said digital stimulation signals:

g. said receiver means additionally including power supply circuit means operably connected to said third resonant circuit means and responsive to said continuous wave energy containing said power signals received by said third resonant circuit means for providing said operating voltages for said receiver means; and h. said receiver means further including signal processor network means operably connected to said power supply circuit means and to said fourth resonant circuit means, said signal processor network means responsive to said operating voltages from said power supply circuit means and additionally responsive to said pulses of radio frequency energy containing said digital stimulation signals at said first frequency for providing stimulating signals to said biological system.

2. The electronic system defined in claim 1, wherein said first, second, third and fourth resonant circuit means each comprise in combination a capacitor and an associated inductor, said inductors of said first and fourth resonant circuit means each being an antenna operable substantially at said first frequency and said inductors of said second and third resonant circuit means each being an antenna operable substantially at said second frequency.

3. The electronic system defined in claim 1, wherein said first analog channel network means comprises oscillator means for generating said radio frequency energy at said first frequency, switch means coupled to said oscillator means responsive to said transmitter logic network means for combining said radio frequency energy at said first frequency with said digital stimulation signals, and amplifier means connected to said switch means for amplifying signals received through said switch means.

4. The electronic system defined in claim 1, wherein said second analog channel network means comprises oscillator means for generating said continuous wave energy at said second frequency, switch means coupled to said oscillator means responsive to said transmitter logic network means for combining said continuous wave energy at said second frequency with said power signals, and amplifier means connected to said switch means for amplifying signals received through said switch means.

5. The electronic system defined in claim 1, wherein said signal processor network means includes:

a. a radio frequency demodulator operably connected to said fourth resonant circuit means and responsive thereto;

b. shift register means operably connected to said radio frequency demodulator for receiving a data signal from said radio frequency demodulator and for providing a positive amplitude word, a negative amplitude word and a data completion pulse, said shift register means also operably connected to said power supply circuit means for receiving a memory reset signal therefrom.

c. mode logic circuit means operably connected to said radio frequency demodulator and to said shift register means for receiving a clock signal from said radio frequency demodulator and for receiving said data completion pulse from said shift register means, said mode logic circuit means providing a shift register clock also said shift register means and for providing a stimulation inhibit signal;

d. stimulation decoder means operably connected to said radio frequency demodulator and to said mode logic circuit means for receiving a triggering clock signal from said radio frequency demodulator and for receiving said stimulation inhibit signal from said mode logic circuit means, said stimulation decoder means s providing mutually exclusive output signals including "ON+", "ON−" and "OFF" signals;

e. positive word multiplexer means operably connected to said shift register means and to said stimulation decoder means for receiving and selecting said positive amplitude word from said shift register means and for receiving said "ON+" signal from said stimulation decoder means;

f. negative word multiplexer means operably connected to said shift register means and to said stimulation decoder means for receiving and selecting said negative amplitude word from said shift register means and for receiving said "ON—" signal from said stimulation decoder means;

g. negative digital-to-analog converter means operably connected to said negative word multiplexer means and responsive thereto for converting said negative amplitude word to an analog signal;

h. positive digital-to-analog converter means operably connected to said positive word multiplexer means and responsive thereto for converting said positive amplitude word to an analog signal;

i. inverting X4 current amplifier means operably connected to said positive digital-to-analog converter means and responsive thereto for providing an output signal amplified by substantially a factor of four to be compatible with said negative amplitude word;

j. inverting constant current amplifier means operably connected to said inverting X4 current amplifier means and to said negative digital-to-analog converter means and responsive thereto for providing said stimulating signals to said biological system; and k. shunt circuit means operably connected to said stimulation decoder means and to said power supply circuit means for receiving said "OFF" signal from said stimulation decoder means and for receiving a safety release signal from said power supply circuit means to provide protection against undesired stimulating signals.

6. The electronic system defined in claim 5, wherein said shunt circuit means comprises interpulse shunt circuit means operably connected to said stimulation decoder means for receiving said "OFF" signal and safety shunt circuit means operably connected to said power supply circuit means for receiving said safety release signal, said interpulse shunt circuit means and said safety shunt circuit means operably coupled in parallel across said biological system.

7. The electronic system defined in claim 1, wherein said power supply circuit means comprises:

a. full-wave rectifier means operably connected to said third resonant circuit means and responsive thereto for converting said continuous wave energy received from said third resonant circuit means into positive and negative d-c voltages;

b. positive voltage regulator means operably connected to said full-wave rectifier means for receiving said positive d-c voltages from said full-wave rectifier means and for providing regulated positive operating voltages for said receiver means;

c. preset circuit means operably connected to said positive voltage regulator means and responsive thereto for providing a memory preset signal comprising a short duration positive pulse for said receiver means;

d. negative voltage regulator means operably connected to said full-wave rectifier means for receiving said negative d-c voltages from said full-wave rectifier means and for providing regulated negative operating voltages for said receiver means; and e. safety shunt control circuit means operably connected to said negative voltage regulator means and responsive thereto for providing a safety release signal for said receiver means.

8. A transmitter for generating transmitted pulses of radio frequency energy at a first frequency containing digital stimulation signals for the stimulation of a biological system in a living body and for additionally generating transmitted signals of continuous wave energy at a second frequency containing power signals, said transmitter comprising:

a. logic network for receiving and processing stimulation and power signal information;

b. first and second analog channel network means operably connected to said logic network means and responsive thereto, said first analog channel network means generating said pulses of radio frequency energy at said first frequency containing said digital stimulation signals, said second analog channel network means generating said continuous wave energy at said second frequency containing said power signals, said first analog channel network means including:
 1. first oscillator means for generating said radio frequency energy at said first frequency,
 2. first switch means coupled to said first oscillator means responsive to said logic network means for combining said radio frequency energy at said first frequency with said digital stimulation signals, and
 3. first amplifier means connected to said first switch means for amplifying signals received through said first switch means, said second analog channel network means including:
 1. second oscillator means for generating said continuous wave energy at said second frequency,
 2. second switch means coupled to said second oscillator means responsive to said logic network means for combining said continuous wave energy at said second frequency with said power signals, and
 3. second amplifier means connected to said second switch means for amplifying signals received through said second switch means; and c. first and second resonant circuit means operably connected to said first and second analog channel network means, respectively, and responsive thereto, said first resonant circuit means resonant at substantially said first frequency for transmitting said pulses of radio frequency energy containing said digital stimulation signals, and said second resonant circuit means resonant at substantially said second frequency for transmitting said continuous wave energy containing said power signals.

9. The transmitter defined in claim 8, wherein said first and second resonant circuit means each comprise in combination a capacitor and an associated inductor, said inductor of said first resonant circuit means being an antenna operable substantially at said first frequency and said inductor of said second resonant circuit means being an antenna operable substantially at said second frequency.

* * * * *